United States Patent
Sawyer

(10) Patent No.: US 7,634,742 B2
(45) Date of Patent: Dec. 15, 2009

(54) GRAPHICAL USER INTERFACE BUTTONS AND TOOLBARS

(75) Inventor: David Sawyer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 637 days.

(21) Appl. No.: 10/820,528

(22) Filed: Apr. 7, 2004

(65) Prior Publication Data

US 2005/0251753 A1 Nov. 10, 2005

(51) Int. Cl.
*G06F 3/048* (2006.01)

(52) U.S. Cl. .............. 715/840; 715/798; 715/801; 715/815; 715/842

(58) Field of Classification Search .......... 715/770, 715/771, 826, 840, 798, 801, 815, 842
See application file for complete search history.

(56) References Cited

U.S. PATENT DOCUMENTS

| | | | | |
|---|---|---|---|---|
| 5,617,526 A * | 4/1997 | Oran et al. | ............ | 715/779 |
| 5,644,737 A * | 7/1997 | Tuniman et al. | ............ | 715/810 |
| 5,644,739 A * | 7/1997 | Moursund | ............ | 715/840 |
| 5,757,371 A * | 5/1998 | Oran et al. | ............ | 715/779 |
| 5,760,772 A * | 6/1998 | Austin | ............ | 715/798 |
| 5,790,120 A * | 8/1998 | Lozares et al. | ............ | 715/779 |
| 6,057,836 A * | 5/2000 | Kavalam et al. | ............ | 715/779 |
| 6,072,486 A * | 6/2000 | Sheldon et al. | ............ | 715/835 |
| 6,111,573 A * | 8/2000 | McComb et al. | ............ | 715/763 |
| 6,111,576 A * | 8/2000 | Moreland et al. | ............ | 715/841 |
| 6,392,673 B1 * | 5/2002 | Andrew et al. | ............ | 715/800 |
| 6,448,986 B1 * | 9/2002 | Smith | ............ | 715/801 |
| 6,624,831 B1 * | 9/2003 | Shahine et al. | ............ | 715/815 |
| 7,036,087 B1 * | 4/2006 | Odom | ............ | 715/779 |
| 7,216,304 B1 * | 5/2007 | Gourdol et al. | ............ | 715/835 |
| 2004/0135812 A1 * | 7/2004 | Tai et al. | ............ | 345/779 |
| 2005/0055645 A1 * | 3/2005 | Matthews et al. | ............ | 715/800 |

OTHER PUBLICATIONS

Microsoft Excel 2000, Microsoft Corporation 1999, as evidenced by "Special Edition Using Microsoft Excel 2000", by Blattner et al., Que Pubilshing 1999.*
Microsoft Excel 2000, Microsoft Corporation 1999, as evidenced by "Special Edition Using Microsoft Office 2000", by Bott et al., Que Pubilshing 1999.*
"Internet Explorer Overview", http://www.microsoft.com/windows/ie/evaluation/overview/default.mspx, Oct. 23, 2003, 4 pages.
"Netscape Navigator", http://www.netscape.net, Dec. 1, 2003, 2 pages.
"Mozilla 1.7/1.7.1", http://www.mozilla.org, Mar. 1, 2004, 2 pages.

(Continued)

*Primary Examiner*—William L Bashore
*Assistant Examiner*—Andrew Tank
(74) *Attorney, Agent, or Firm*—Fish & Richardson P.C.

(57) ABSTRACT

Methods, systems and apparatus, including computer program products, for docking toolbars and moving buttons from one toolbar to another toolbar on a graphical user interface. In calculating an adapted presentation for the destination toolbar, the destination toolbar constraints determine the size of moved buttons such that the destination toolbar size does not change and all the toolbar buttons on the destination toolbar are a uniform size.

33 Claims, 1 Drawing Sheet

OTHER PUBLICATIONS

"Opera 7.52, Everything You Need Online", http://opera.com, Mar. 1, 2004 1 page.
"Internet Control Center", http://www.downloads.com, Mar. 23, 1999, 1 page.
"WSTBar for Windows 95", http://www.infinet.com/~jdzg/wstbar95.zip, Apr. 27, 1996, 2 pages.
http://www.microsoft.com/windows/ie/ie6/using/howto/customizing/custombrowser.mspx, Internet Explorer 6: Customize Your Web Browsing Layout, Published Mar. 26, 2003, Updated Jun. 20, 2006.
http://support.microsoft.com/kb/198177, Article ID: 198177: Customizing the Standard Buttons toolbar in Internet Explorer, Last Review: May 10, 2007, Revision: 4.3.

* cited by examiner

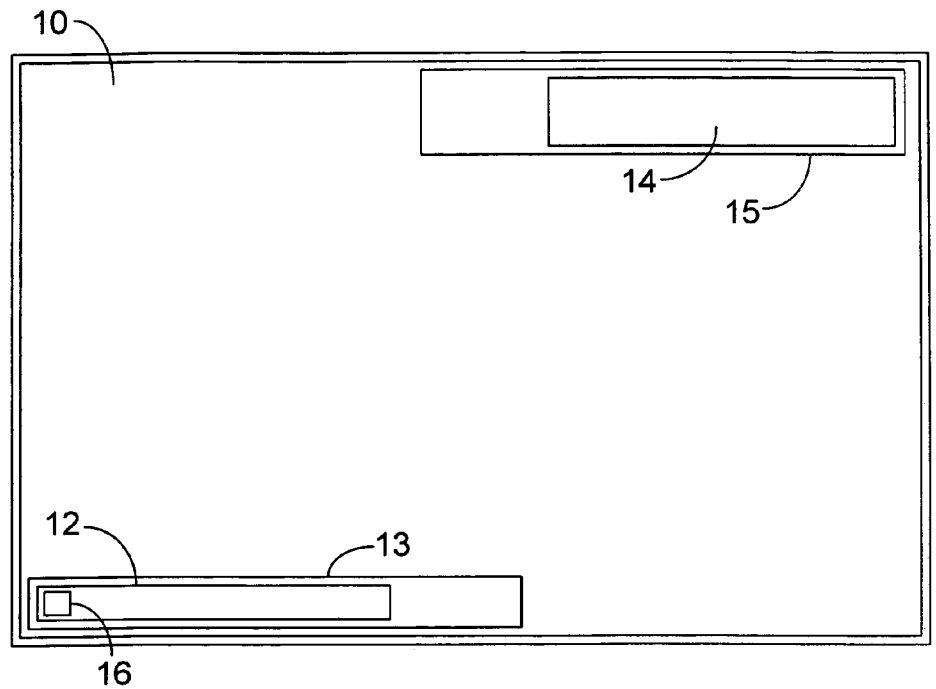
FIG. 1
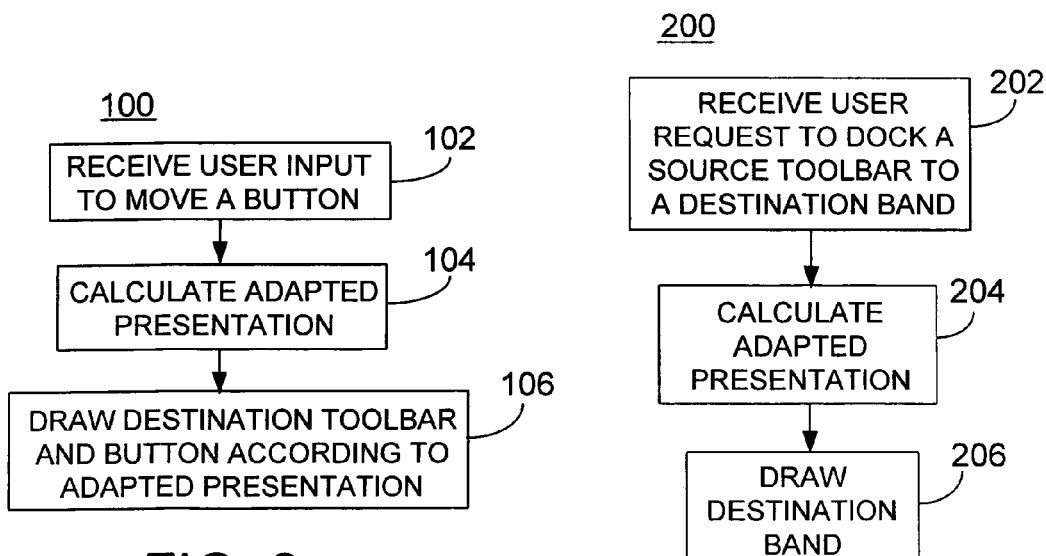
FIG. 2
FIG. 3

GRAPHICAL USER INTERFACE BUTTONS AND TOOLBARS

BACKGROUND

The present invention relates to graphical user interface toolbars and/or buttons.

In the graphical user interface for a computer, a toolbar is a horizontal row or vertical column of one or more selectable image "buttons" that give a user a constantly visible reminder of and an easy way to select certain desktop or other application functions, such as saving or printing a document or moving pages forwards or backwards within a Web browser. A button is a graphical element in a dialog box that, when activated, performs a specific function. A user activates the button by clicking on it with a mouse or, if the button has the focus, by hitting the "Return" or "Enter" key.

Most operating systems come with a toolbar. In addition, many application programs, such as word processors and spreadsheet programs, come with one or more toolbars as part of their user interface.

In addition to the toolbars that come with an operating system desktop or an application, some software developers or third parties provide supplementary toolbars that can be downloaded and installed. Supplementary toolbar functions can include quick access to news, sports, and weather headlines, instant form completion, instant access to favorite sites, faster searches, and so forth. A similar user interface device, the taskbar, provides information about active applications.

SUMMARY

The present invention provides methods and apparatus, including computer program products, for docking toolbars and for moving buttons from one toolbar to another toolbar.

In general, in one aspect, the invention features a method including receiving from a user of a graphical user interface an input requesting the moving of a button from a source toolbar to a destination toolbar, the button having a button presentation and a set of button constraints and the destination toolbar having a toolbar presentation and a set of toolbar constraints, the constraints being constraints on a presentation of the button or the destination toolbar, respectively, calculating an adapted presentation of the destination toolbar with the button, including calculating a modified presentation of the button subject to set of button constraints and calculating a modified presentation of the destination toolbar subject to the set of toolbar constraints, and drawing the destination toolbar and the button on the destination toolbar according to the adapted presentation.

In embodiments, the input further includes a request to move a control, the control having a control presentation and a set of control constraints. Calculating the modified presentation of the button can be subject to the set of toolbar constraints, and calculating the modified presentation of the destination toolbar can be further subject to the button constraints.

The destination toolbar can include a set of destination toolbar buttons at a time of the input, and the toolbar constraints can include constraints specific to the destination toolbar and constraints derived from the set of destination toolbar buttons.

The button presentation can be defined by vector graphic data, and calculating a modified presentation of the button can include calculating a size for the button, where the size is determined solely by the modified presentation of the destination toolbar.

The button presentation can be defined by raster graphic data and the button constraints can specify that the button should be presented at one of a fixed number of presentation sizes. The fixed number of presentation sizes can include sizes of 24-by-24 pixels and 32-by-32 pixels.

In another aspect, the invention features receiving from a user of a graphical user interface an input requesting the docking of a source toolbar to a destination band, the destination band including a destination toolbar, the source toolbar having one or more source toolbar buttons, each of the one of more source toolbar buttons having a button presentation and a set of button constraints, the source toolbar having a toolbar presentation and a set of toolbar constraints, the destination toolbar having a toolbar presentation and a set of toolbar constraints, the constraints being constraints on a presentation of the source toolbar buttons or source toolbar or the destination toolbar, respectively, calculating an adapted presentation of the destination band with the one or more source toolbar buttons, including calculating a modified presentation of the one or more source toolbar buttons subject to the set of button constraints, calculating a modified presentation of the source toolbar and the destination toolbar subject to the set of toolbar constraints, and drawing the destination band, the destination toolbar and the one or more source toolbar buttons according to the adapted presentation.

The button presentation can be defined by vector graphic data, and calculating a modified presentation of the button can include calculating a size for the button, where the size is determined solely by the modified presentation of the destination toolbar.

The button presentation can be defined by raster graphic data and the button constraints can specify that the button should be presented at one of a fixed number of presentation sizes. The fixed number of presentation sizes can include sizes of 24-by-24 pixels and 32-by-32 pixels.

In embodiments, the destination toolbar includes a set of destination buttons at a time of the input, and the toolbar constraints include constraints specific to the destination toolbar and constraints derived from the set of destination buttons.

The invention can be implemented to realize one or more of the following advantages.

Toolbar buttons can support various sizes of toolbars. When a toolbar button is dragged from a source toolbar to a destination toolbar, the button checks the destination toolbar and selects a size best suited to fit its new placement in the destination toolbar. Thus, the look of the destination toolbar remains the same, with toolbar buttons of uniform size within the destination toolbar.

A user can have a toolbar with a few favorite buttons in a large size toolbar and another (small size) toolbar of lesser-used buttons of small size. When a button is moved from the large size toolbar to the small size toolbar, the small size toolbar remains the same. When a button is dragged to the large size toolbar, the small artwork used in the small size toolbar is no longer used and the button takes advantage of the increased space it has for drawing its artwork in the large size toolbar.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is block diagram
FIG. 2 is a flow diagram.
FIG. 3 is a flow diagram.
Like reference numbers and designations in the various drawings indicate like elements.

DETAILED DESCRIPTION

As shown in FIG. 1, a graphical user interface 10 includes a toolbar 12 residing in a band 13 and a toolbar 14 residing in a band 15. Toolbar 12 includes a control or button 16. The graphical user interface 10 allows a user to interact with a computer or other electronic device through use of an input device, such as a mouse, touchpad, trackball, joystick, pointing device or through a keyboard. The input device allows the user to initiate actions by pointing at an object on the graphical user interface 10, such as toolbar 12 and/or button 16, and "clicking" or pressing a control button associated with the input device.

A graphical user interface 10 can be supplied by an operating system provider or by third parties who design specialized or enhanced interfaces, often in conjunction with application programs. For example, Windows® XP from Microsoft Corporation of Redmond, Wash. provides a graphical user interface that is used to control interaction between the user and the operating system. The Windows® XP graphical user interface also provides support to applications software, such that each application has a similar look and feel.

Third party vendors can provide software that modifies or replaces portions of the Windows® XP graphical user interface that controls interaction between the user and the operating system. One such application is Acrobat®. Acrobat® is a program from Adobe that lets the user capture a document and then view it in its original format and appearance. Acrobat® is used for making documents or brochures that were designed for the print medium viewable electronically and capable of being shared with others on the Internet. To view an Acrobat document, which is called a Portable Document Format (PDF) file, the Acrobat® Reader is used. The reader can be used as a standalone reader or as a plug-in in a Web browser.

In general, a toolbar can be thought of as a container that groups several components, usually buttons with icons, into a row or column. Often, the toolbar provides easy access to functionality that is also in menus. Each toolbar 12, 14, has a size. In this particular example, toolbar 14 is larger than toolbar 12, i.e., a height and width of toolbar 14 are greater than a height and width of toolbar 12.

Toolbar 12 includes the control or button 16. In general, a button is a graphical element in a toolbar that, when activated, performs a specific function. A user activates the button by clicking on it with a mouse or, if the button has the focus, by hitting the Return or Enter key. Most operating systems, such as Linux and Windows® XP, come with a toolbar. In addition, many application programs, such as word processors and spreadsheet programs, come with one or more toolbars as part of their user interface. In some applications, buttons can provide quick and easy access to important functions.

Button 16 is sized to fit within toolbar 12. Each button has a height and width that can be modified in conjunction with a height and width of the toolbar 12.

In some applications, the user can customize a toolbar layout by dragging buttons within or among toolbars either directly or by entering a customization mode. In the same applications or other applications, one toolbar can be dragged to another toolbar. The process of dragging one toolbar to another toolbar is generally referred to as docking. Docking results in a first toolbar and a second toolbar residing a single band, usually the band containing the second toolbar. If an application supports toolbars of different heights for horizontal toolbars or widths for vertical toolbars, buttons dragged between toolbars can result in toolbars looking unbalanced, with buttons of various sizes. Similarly, docking two toolbars together can result in two different sets of button sizes.

As shown in FIG. 2, a process 100 provides a model for dragging a button within a source toolbar to a destination toolbar. For ease of discussion, heights for horizontal toolbars are used as an example for process 100. However, the systems and techniques described herein are not limited to heights for horizontal toolbars; rather, they can be used in environment that needs a model for dragging buttons and toolbars to toolbars of different heights and widths, and the dimensions of buttons can be described by scalars and/or vectors.

Process 100 receives (102) from a user of a graphical user interface an input requesting the moving of a button from a source toolbar to a destination toolbar. The button has a button presentation and a set of button constraints. For example, a button constraint can be a range of button heights.

The destination toolbar has a toolbar presentation and a set of toolbar constraints. An example toolbar constraint is a range of heights and a range of widths. In a particular example, the toolbar constraints include constraints specific to the destination toolbar and constraints derived from a set of destination toolbar buttons. In another particular example, the destination toolbar can include a set of destination toolbar buttons at a time of receiving (102) the input.

Process 100 calculates (104) an adapted presentation of the destination toolbar with the button. Calculating the adapted presentation of the destination toolbar button includes calculating a modified presentation of the button subject to set of button constraints and calculating a modified presentation of the destination toolbar subject to the set of toolbar constraints.

In a particular example, the button presentation is defined by vector graphic data. Calculating the modified presentation of the button then includes calculating a size for the button, where the size is determined solely by the modified presentation of the destination toolbar.

In another particular example, the button presentation is defined by raster graphic data and the button constraints specify that the button should be presented at one of a fixed number of presentation sizes. Example presentation sizes include sizes of 24-by-24 pixels and 32-by-32 pixels.

Process 100 draws (106) the destination toolbar and the button on the destination toolbar according to the adapted presentation.

As shown in FIG. 3, a process 200 provides a model for docking a source toolbar to destination band having a destination toolbar. Process 200 receives (202) from a user of a graphical user interface an input requesting the docking of a source toolbar to a destination band. The destination band includes a destination toolbar. The source toolbar includes one or more source toolbar buttons. Each of the one of more source toolbar buttons has a button presentation and a set of button constraints. The source toolbar has a toolbar presentation and a set of toolbar constraints and the destination toolbar has a toolbar presentation and a set of toolbar constraints. The constraints are constraints on a presentation of the source toolbar buttons or source toolbar or the destination toolbar, respectively.

Process 200 calculates (202) an adapted presentation of the destination band with the one or more source toolbar buttons. Calculating (202) includes calculating a modified presentation of the one or more source toolbar buttons subject to the set of button constraints, and calculating a modified presentation of the source toolbar and the destination toolbar subject to the set of toolbar constraints.

As described above, the destination toolbar has a toolbar presentation and a set of toolbar constraints. An example toolbar constraint is a range of heights and a range of widths. In a particular example, the toolbar constraints include constraints specific to the destination toolbar and constraints derived from a set of destination toolbar buttons. In another particular example, the destination toolbar can include a set of destination toolbar buttons at a time of receiving (202) the input.

The process 200 draws (204) the destination band, the destination toolbar and the one or more source toolbar buttons according to the adapted presentation.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. For example, other applications can be docking to an empty toolbar, dragging a button to an empty toolbar, docking an empty toolbar to a non-empty toolbar, and docking an empty toolbar to an empty toolbar.

What is claimed is:

1. A method comprising:
receiving in a graphical user interface an input requesting the moving of a button from a source toolbar to a destination toolbar, the button having a button presentation and a set of button constraints, the button constraints including a range of button heights and a range of button widths, the button constraints specifying that the button is to be presented at one of a fixed number of presentation sizes, and the destination toolbar having a set of destination toolbar buttons at a time of the input, a toolbar presentation, and a set of toolbar constraints, the toolbar constraints specifying a range of toolbar heights for a horizontal toolbar presentation and a range of toolbar widths for a vertical toolbar presentation, the toolbar constraints including constraints derived from the set of destination toolbar buttons;
calculating an adapted presentation of the destination toolbar with the button, including calculating a modified presentation of the button subject to the set of button constraints and calculating a modified presentation of the destination toolbar subject to the set of toolbar constraints, such that when the button is moved from the source toolbar to the destination toolbar, the destination toolbar constraints and the presentation sizes specified by the button constraints determine the size of the moved button in the destination toolbar; and
drawing the destination toolbar with the button on the destination toolbar according to the adapted presentation, wherein the destination toolbar size does not change and all the buttons on the destination toolbar are a uniform size;
wherein receiving is performed by one or more computers.

2. The method of claim 1, wherein:
the input further includes a request to move a control, the control having a control presentation and a set of control constraints.

3. The method of claim 1, wherein:
the toolbar constraints further include constraints specific to the destination toolbar.

4. The method of claim 1, wherein:
the button presentation is defined by vector graphic data.

5. The method of claim 1, wherein:
the button presentation is defined by raster graphic data.

6. The method of claim 1, wherein:
the fixed number of presentation sizes includes sizes of 24-by-24 pixels and 32-by-32 pixels.

7. A method comprising:
receiving in a graphical user interface an input requesting the docking of a source toolbar to a destination band, the destination band including a destination toolbar, the source toolbar having one or more source toolbar buttons, each of the one of more source toolbar buttons having a button presentation and a set of button constraints, the button constraints including a range of button heights and a range of button widths, the button constraints specifying that a respective source toolbar button is to be presented at one of a fixed number of presentation sizes, the source toolbar having a source toolbar presentation and a set of source toolbar constraints, the source toolbar constraints specifying a range of source toolbar heights for a horizontal toolbar presentation and a range of source toolbar widths for a vertical toolbar presentation, the destination toolbar having a set of destination toolbar buttons, a destination toolbar presentation, and a set of destination toolbar constraints, the destination toolbar constraints including a range of destination toolbar heights for a horizontal toolbar presentation and a range of destination toolbar widths for a vertical toolbar presentation, where the destination toolbar constraints include constraints derived from the set of destination toolbar buttons;

calculating an adapted presentation of the destination band with the one or more source toolbar buttons, including calculating a modified presentation of the one or more source toolbar buttons subject to the set of button constraints and calculating a modified presentation of the source toolbar and the destination toolbar subject to the set of destination toolbar constraints, such that the destination toolbar constraints and the presentation sizes specified by the button constraints determine the size of the one or more source toolbar buttons; and drawing the destination band, the destination toolbar, and the one or more source toolbar buttons according to the adapted presentation, wherein the destination toolbar size does not change and all the toolbar buttons on the destination toolbar are a uniform size;

wherein receiving is performed by one or more computers.

8. The method of claim 7, wherein:
the destination toolbar constraints further include constraints specific to the destination toolbar.

9. The method of claim 7, wherein:
the button presentation is defined by vector graphic data.

10. The method of claim 7, wherein:
the button presentation is defined by raster graphic data.

11. The method of claim 7, wherein:
the fixed number of presentation sizes includes sizes of 24-by-24 pixels and 32-by-32 pixels.

12. A computer program product, tangibly embodied in a machine-readable storage device, for drawing a button moved from a source toolbar to a destination toolbar, comprising instructions operable to cause a programmable processor to:
receive in a graphical user interface (GUI) an input requesting the moving of the button from the source toolbar to the destination toolbar, the button having a button presentation and a set of button constraints, the button constraints including a range of button heights and a range of button widths, the button constraints specifying that the button is to be presented at one of a fixed number of presentation sizes, and the destination toolbar having a set of destination toolbar buttons at the time of the input, a toolbar presentation, and a set of toolbar constraints, the toolbar constraints specifying a range of toolbar heights for a horizontal toolbar presentation and a range of toolbar widths for a vertical toolbar presentation, the toolbar constraints including constraints derived from the set of destination toolbar buttons;

calculate an adapted presentation of the destination toolbar with the button, including calculating a modified presentation of the button subject to the set of button constraints and calculating a modified presentation of the destination toolbar subject to the set of toolbar constraints, such that when the button is moved from the source toolbar to the destination toolbar, the destination toolbar constraints and the presentation sizes specified by the button constraints determine the size of the moved button in the destination toolbar; and draw the destination toolbar with the button on the destination toolbar according to the adapted presentation, wherein the destination toolbar size does not change and all the buttons on the destination toolbar are a uniform size.

13. The product of claim 12, wherein:
the toolbar constraints further include constraints specific to the destination toolbar.

14. The product of claim 12, wherein:
the button presentation is defined by vector graphic data.

15. The product of claim 12, wherein:
the button presentation is defined by raster graphic data.

16. The product of claim 12, wherein:
the fixed number of presentation sizes include sizes of 20-by-20 pixels and 32-by-32 pixels.

17. The product of claim 12, wherein:
the input further includes a request to move a control, the control having a control presentation and a set of control constraints.

18. A computer program product, tangibly stored on a computer-readable medium, for moving a source toolbar to a destination toolbar, comprising instructions operable to cause a programmable processor to:
receive in a graphical user interface an input requesting the docking of a source toolbar to a destination band, the destination band including a destination toolbar, the source toolbar having one or more source toolbar buttons, each of the one of more source toolbar buttons having a button presentation and a set of button constraints, the button constraints including a range of button heights and a range of button widths, the button constraints specifying that a respective source toolbar button is to be presented at one of a fixed number of presentation sizes, the source toolbar having a source toolbar presentation and a set of source toolbar constraints, the source toolbar constraints including a range of source toolbar heights for a horizontal toolbar presentation and a range of source toolbar widths for a vertical toolbar presentation, the destination toolbar having a set of destination toolbar buttons, a destination toolbar presentation, and a set of destination toolbar constraints, the destination toolbar constraints including a range of destination toolbar heights for a horizontal toolbar presentation and a range of destination toolbar widths for a vertical toolbar presentation, where the destination toolbar constraints include constraints derived from the set of destination toolbar buttons;

calculate an adapted presentation of the destination band with the one or more source toolbar buttons, including calculating a modified presentation of the one or more source toolbar buttons subject to the set of button constraints and calculating a modified presentation of the source toolbar and the destination toolbar subject to the set of destination toolbar constraints, such that the destination toolbar constraints and the presentation sizes specified by the button constraints determine the size of the one or more source toolbar buttons; and draw the destination band, the destination toolbar, and the one or more source toolbar buttons according to the adapted presentation, wherein the destination toolbar size does not change and all the toolbar buttons on the destination toolbar are a uniform size.

19. The product of claim 18, wherein:
the destination toolbar constraints further include constraints specific to the destination toolbar.

20. The product of claim 18, wherein:
the button presentation is defined by vector graphic data.

21. The product of claim 18, wherein:
the button presentation is defined by raster graphic data.

22. The product of claim 18, wherein:
the fixed number of presentation sizes include sizes of 20-by-20 pixels and 32-by-32 pixels.

23. A system, comprising:
means for receiving in a graphical user interface an input requesting the moving of a button from a source toolbar to a destination toolbar, the button having a button presentation and a set of button constraints, the button constraints including a range of button heights and a range of button widths, the button constraints specifying that the button is to be presented at one of a fixed number of presentation sizes, and the destination toolbar having a set of destination toolbar buttons at a time of the input, a toolbar presentation, and a set of toolbar constraints, the toolbar constraints specifying a range of toolbar heights for a horizontal toolbar presentation and a range of toolbar widths for a vertical toolbar presentation, the toolbar constraints including constraints derived from the set of destination toolbar buttons;

means for calculating an adapted presentation of the destination toolbar with the button, including calculating a modified presentation of the button subject to the set of button constraints and calculating a modified presentation of the destination toolbar subject to the set of toolbar constraints, such that when the button is moved from the source toolbar to the destination toolbar, the destination toolbar constraints and the presentation sizes specified by the button constraints determine the size of the moved button in the destination toolbar; and means for drawing the destination toolbar with the button on the destination toolbar according to the adapted presentation, wherein the destination toolbar size does not change and all the buttons on the destination toolbar are a uniform size.

24. The system of claim 23, wherein:
the toolbar constraints further include constraints specific to the destination toolbar.

25. The system of claim 23, wherein:
the button presentation is defined by vector graphic data.

26. The system of claim 23, wherein:
the button presentation is defined by raster graphic data.

27. The method of claim 23, wherein:
the fixed number of presentation sizes includes sizes of 24-by-24 pixels and 32-by-32 pixels.

28. The system of claim 23, wherein:
the input further includes a request to move a control, the control having a control presentation and a set of control constraints.

29. A system, comprising:
means for receiving in a graphical user interface an input requesting the docking of a source toolbar to a destination band, the destination band including a destination toolbar, the source toolbar having one or more source toolbar buttons, each of the one of more source toolbar buttons having a button presentation and a set of button constraints, the button constraints including a range of button heights and a range of button widths, the button constraints specifying that a respective source toolbar button is to be presented at one of a fixed number of presentation sizes, the source toolbar having a source toolbar presentation and a set of source toolbar constraints, the source toolbar constraints specifying a range of source toolbar heights for a horizontal toolbar presentation and a range of source toolbar widths for a vertical toolbar presentation, the destination toolbar having a set of destination toolbar buttons, a destination toolbar presentation, and a set of destination toolbar constraints, the destination toolbar constraints including a range of destination toolbar heights for a horizontal toolbar presentation and a range of destination toolbar widths for a vertical toolbar presentation, where the destination toolbar constraints include constraints derived from the set of destination toolbar buttons;

means for calculating an adapted presentation of the destination band with the one or more source toolbar buttons, including calculating a modified presentation of the one or more source toolbar buttons subject to the set of button constraints and calculating a modified presentation of the source toolbar and the destination toolbar subject to the set of destination toolbar constraints, such that the destination toolbar constraints and the presentation sizes specified by the button constraints determine the size of the one or more source toolbar buttons; and means for drawing the destination band, the destination toolbar, and the one or more source toolbar buttons according to the adapted presentation, wherein the destination toolbar size does not change and all the toolbar buttons on the destination toolbar are a uniform size.

30. The system of claim 29, wherein:
the destination toolbar constraints further include constraints specific to the destination toolbar.

31. The system of claim 29, wherein:
the button presentation is defined by vector graphic data.

32. The system of claim 29, wherein:
the button presentation is defined by raster graphic data.

33. The system of claim 29, wherein:
the fixed number of presentation sizes includes sizes of 24-by-24 pixels and 32-by-32 pixels.

* * * * *

UNITED STATES PATENT AND TRADEMARK OFFICE
CERTIFICATE OF CORRECTION

PATENT NO.      : 7,634,742 B2                                        Page 1 of 1
APPLICATION NO. : 10/820528
DATED           : December 15, 2009
INVENTOR(S)     : David Sawyer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this

Ninth Day of November, 2010

David J. Kappos
*Director of the United States Patent and Trademark Office*